United States Patent [19]
Tuthill

[11] 3,897,140
[45] July 29, 1975

[54] MULTILAYER SOLAR FILTER REDUCING DISTORTIVE DIFFRACTION

[76] Inventor: Roger W. Tuthill, 11 Tanglewood Ln., Mountainside, N.J. 07092

[22] Filed: June 14, 1974

[21] Appl. No.: 479,508

Related U.S. Application Data

[63] Continuation of Ser. No. 317,811, Dec. 22, 1972, abandoned.

[52] U.S. Cl. .................. 350/314; 161/4; 161/408; 350/314
[51] Int. Cl.² .................. G02B 5/26; G02B 5/20
[58] Field of Search ....... 350/1, 164, 166, 314, 171; 117/33.3, 71 R; 161/1, 4, 408, 183, 214, 216, 220

[56] References Cited
UNITED STATES PATENTS

| | | |
|---|---|---|
| 2,817,124 | 12/1957 | Dybvig .................. 161/214 |
| 3,011,383 | 12/1961 | Sylvester et al. .................. 161/408 |
| 3,118,781 | 1/1964 | Downing .................. 350/1 |
| 3,649,359 | 3/1972 | Apfel et al. .................. 117/33.3 |
| 3,682,528 | 8/1972 | Apfel et al. .................. 350/1 |

*Primary Examiner*—Ronald J. Stern
*Attorney, Agent, or Firm*—Shapiro and Shapiro

[57] ABSTRACT

A filter for blocking out harmful solar radiation for direct viewing or for photographic purposes employs a plurality of flexible, transparent resin film layers which are coated with metal to achieve optical clarity and to effectively shield the user from most of the sun's energy while allowing enough light to pass through the filter. The total thickness of the resin material is not more than approximately 0.002 inch, and the total thickness of the metal on the film layers provides an opaqueness to allow passage of approximately 0.01 percent sunlight.

13 Claims, 3 Drawing Figures

MULTILAYER SOLAR FILTER REDUCING DISTORTIVE DIFFRACTION

This is a continuation of application Ser. No. 317,811, filed Dec. 22, 1972.

The invention relates to solar filters, and is more particularly directed to filters suitable for use with telescopes.

BACKGROUND OF THE INVENTION

Observing the sun safely is difficult. The sun's radiant energy in all wave lengths is exceedingly strong, and to prevent injury to the eye or damage to photographic equipment requires broad band filtering. One way for astronomers to view the sun is not to look through the telescope at all, but rather to use the eye-piece of the telescope system to project the image of the sun on a white surface for viewing of the projected image with the naked eye or for taking photographs of the projected image. This way of observing the sun has its limitations because of the interference caused by stray light from the surrounding atmosphere.

Another way to observe the sun is to use a partially reflecting optical wedge in the light path before the eye-piece but after the objective. This partially reflecting optical wedge, usually called a Herschel wedge, is an unsilvered, unsymmetrical diagonal mirror. It is expensive, and it reflects so much light that an additional filter is usually required.

The spectrum of the sun's energy spans from the ultra violet through the visible to the infra-red wave lengths. The infra-red rays constitute the greatest potential danger to the eyes, and require filtering the most. Filters for use with a telescope for viewing the sun directly have been made from black and white negatives (the silver in the emulsion does the filtering), are welders' glasses or smoked glass. Each of these devices furnish an imperfect image, scattering the light badly and generally they do not provide safe viewing conditions.

Filtering is best accomplished by providing an optical surface with a suitable thin metallic film such as chromium. This film of metal effectively shields the eyes from the damaging effects of the infra-red rays of the sun, and does not distort the image because the coating is on an optically ground surface. Such an optically coated surface is used by mounting it ahead of the telescope objective. Such filters however are very expensive because they are made of high quality optical glass. Also, such filters do not completely reflect the infra-red end of the sun's spectrum; consequently, they permit the air in the optical path of the telescope to heat up and cause turbulance thereby causing distortion of the image.

SUMMARY OF THE INVENTION

It has been determined that a highly effective, and inexpensive, solar filter is provided by a plurality of flexible, transparent resin film layers each having a metal coating wherein the resin film material has a total thickness of not more than approximately 0.002 inch, and wherein the resin film layers are coated with metal having a total thickness to provide an opaqueness which allows passage of approximately 0.01 percent sunlight.

The optical qualities of flexible, transparent resin film depends upon its thickness. Ths thicker the film the greater the distortion of any object viewed through the film. Distortion is minimized by making the film very thin. However, casting a clear resin to furnish a film which is very thin results in pin holes. When a film having pin holes is placed in front of a telescope there is a diffraction effect which causes distortion of the resultant image of the sun. The filter of the invention overcomes these problems by utilizing a plurality of very thin, flexible, transparent, metallized resin film layers, the total thickness of the resin material of the multi-ply filter being not more than approximately 0.002 inch.

Enough light must be allowed to pass through the filter to be visible by the eye, or to be indicated on photographic film, coupled with the attainment of a sufficiently high measure of filtering of the sun's radiant energy. It has been determined that a metal coating is suitable which passes approximately 0.01 percent of the sunlight. Such amount of light will be transmitted by a plurality of aluminum coatings providing a total resistance of approximately 0.4 to 0.9 ohm per square unit. The resistance is the same per square inch or per square any dimension because of the nature of resistance. Thin metal coatings are best or more accurately measured by the resistance method.

DESCRIPTION OF THE PREFERRED EMBODIMENT

A solar filter in accordance with the invention comprises a plurality of flexible, transparent resin film layers which, exclusive of metal, have a total thickness of not more than approximately 0.002 inch. Preferably, a polyester resin, for example, polyethylene terephthalate, is coated by the deposition thereon of aluminum vapors under a high vacuum. Polyethylene terephthalate is selected because of its flexibility, heat resistance, and tensile strength coupled with its optical properties when cast as a thin film. In the preferred form of the invention a polyethylene terephthalate film having a thickness of 0.00035 inch is used, and such film is metallized with aluminum on one side only. The aluminum coating on one side of the film has a thickness to provide a resistance of approximately 0.8 to 1.8 ohm per square unit.

Figure 1:
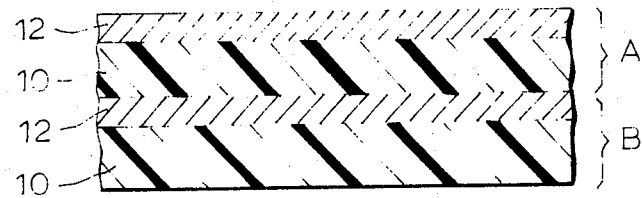
FIGS. 1, 2 and 3 are cross-sectional views, on an enlarged scale, of multi-ply filters made in accordance with the invention.
Figure 2:
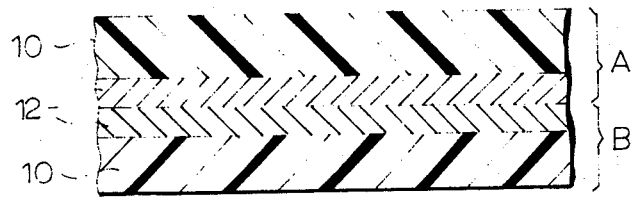
Figure 3:
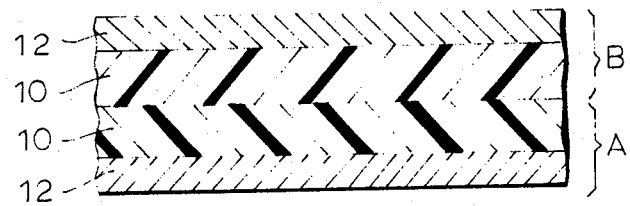

To obviate the problems of pin holes when using film of the preferred thinness as above described, one metallized film is placed upon a second like metallized film to furnish a filter having two layers. Instead of placing one metallized film upon another, the multi-ply filter may be made by folding a metallized film of sufficient area upon itself. The multi-ply filter may comprise two metallized films A and B as shown in FIG. 1 wherein the resin film 10 has a metallized coating 12 with the plies related so that the resin film 10 of one ply is positioned upon the metal coating of the adjacent ply. In FIG. 2 one metallized film is placed upon the other metallized film so that the metal coatings are adjacent one another. As shown in FIG. 3, one metallized film may be placed upon the other so that the transparent resin films are in contiguity. The possibility of a pin hole in one ply or layer being aligned with a pin hole in the other layer is very remote, thereby making the probability of diffraction and the distortion of the sun's image quite remote. Since each aluminum coating of each of the two resin films has a thickness which provides a resistance in the range of approximately 0.8 to 1.8 ohm per square unit, the total metal coating thickness provides a resistance of approximately 0.4 to 0.9 ohm per square unit. A filter thus made blocks out approximately 99.99 percent of the sunlight.

While a polyethylene terephthalate resin for the film is preferred, it is within the scope of the invention to use a film made of a methyl methacrylate, a polycarbonate, a polystyrene, cellulose acetate, or cellulose acetate-butyrate.

While aluminum, or its alloys, is preferred it is within the scope of the invention to deposit chromium, copper or silver, or their respective alloys, on the film in an amount to furnish a filter having an opaqueness to allow passage of approximately 0.01 percent sunlight. The metal coating may be applied to the resin film by any one of a number of techniques known in the art. Preferably the metal is applied by the deposition of the metal in vapor form under a high vacuum or vacuum metallizing as it is termed. The metal may also be applied by what is known as electroless deposition, or procedures which involve chemical sensitizing or chemical seeding.

A filter made in accordance with the preferred form of the invention has been tested in astronomical optical systems for viewing the sun with a telescope of focal length to diameter ratio of 4 to 90 (F/4 – F/90). Whether the telescope is of the reflector type or refractor type, the filter of the invention is positioned in front of the telescope; that is, between the end of the telescope and the sun. In the case of a reflector telescope the multi-ply filter of the invention is held at its edges in a simple annular frame, and the frame is positioned on the end of the telescope tube remote from the end having the primary mirror. In the case of a refractor telescope, the frame supporting the multi-layered filter is placed on the end of the tube and is located just beyond the objective.

When a filter made in accordance with the invention is used to pass a wave front having no more than one twentieth wave error then the wave front is degraded to about one fifth wave. Such quality compares favorably with the quality of the much more expensive optically ground glass type of filter.

It is believed that the advantages and improved results furnished by the solar filter of the invention will be apparent from the foregoing description of a preferred embodiment of the invention. Various changes and modifications may be made without departing from the spirit and scope of the invention as sought to be defined in the following claims.

1. A solar filter for an astronomical optical instrument, the solar filter consisting essentially of a plurality of flexible, transparent resin film layers each having a metal coating, the metal coated film layers overlying each other, the film layers having a total thickness not more than approximately 0.002 inch and the metal coatings having a total thickness to provide an opaqueness to allow passage of approximately 0.01 percent sunlight, each of the film layers being of a thinness so that there are pinholes therein, whereby the possibility of a pinhole in one film layer being aligned with a pinhole in another film layer is minimized thus reducing the distortive diffraction effect of said pinholes.

2. A solar filter according to claim 1 wherein the film layers each have a thickness of approximately 0.00035 inch.

3. A solar filter according to claim 2 wherein each of the film layers is a polyethylene terephthalate.

4. A solar filter according to claim 1 wherein the metal coatings are of aluminum.

5. A solar filter according to claim 4 wherein the aluminum coatings provide a resistance of approximately 0.4 to 0.9 ohm per square unit.

6. A solar filter according to claim 1 wherein the plurality of film layers comprises two film layers each having a coating on one side only.

7. A solar filter according to claim 6 wherein each metal coating is aluminum having a resistance of approximately 0.8 to 1.8 ohm per square unit.

8. A solar filter according to claim 7 wherein the film layers each have a thickness of approximately 0.00035 inch.

9. A solar filter according to claim 8 wherein each of the film layers is a polyethylene terephthalate.

10. A solar filter for an astronomical optical instrument, the solar filter consisting essentially of a plurality of flexible, transparent resin film layers each having an aluminum coating on one side only, the aluminum coated film layers overlying each other, the film layers having a total thickness not more than approximately 0.002 inch, and the aluminum coatings having a resistance of approximately 0.4 to 0.9 ohm per square unit, each of the film layers being of a thinness so that there are pinholes therein, whereby the possibility of a pinhole in one film layer being aligned with a pinhole in another film layer is minimized thus reducing the distortive diffraction effect of said pinholes.

11. A solar filter according to claim 10 wherein there are two aluminum coated resin film layers, and wherein the coating on each layer has a resistance of approximately 0.8 to 1.8 ohm per square unit.

12. A solar filter according to claim 11 wherein each of the film layers is a polyethylene terephthalate.

13. A solar filter according to claim 12 wherein the film layers each have a thickness of approximately 0.00035 inch.

* * * * *